US011946353B2

(12) United States Patent
Bosco et al.

(10) Patent No.: US 11,946,353 B2
(45) Date of Patent: Apr. 2, 2024

(54) MOBILE HYBRID POWER PLATFORM

(71) Applicant: MTU America Inc., Novi, MI (US)

(72) Inventors: David Bosco, Novi, MI (US); Ranald Archer, Novi, MI (US); Alexander Castillo, Novi, MI (US); Nicholas Falce, Novi, MI (US); Marco Burger, Novi, MI (US)

(73) Assignee: MTU America Inc., Novi, MI (US)

(*) Notice: Subject to any disclaimer, the term of this patent is extended or adjusted under 35 U.S.C. 154(b) by 0 days.

(21) Appl. No.: 18/364,812

(22) Filed: Aug. 3, 2023

(65) Prior Publication Data

US 2023/0383635 A1 Nov. 30, 2023

Related U.S. Application Data

(63) Continuation of application No. 17/457,071, filed on Dec. 1, 2021, now Pat. No. 11,732,561.
(Continued)

(51) Int. Cl.
*E21B 43/26* (2006.01)
*F02B 43/10* (2006.01)
(Continued)

(52) U.S. Cl.
CPC .......... *E21B 43/2607* (2020.05); *F02B 43/10* (2013.01); *F02B 63/042* (2013.01);
(Continued)

(58) Field of Classification Search
CPC ...... E21B 41/0085; E21B 43/00; E21B 43/26; E21B 43/2607; F04B 17/02; F04B 17/03;
(Continued)

(56) References Cited

U.S. PATENT DOCUMENTS 9,103,193 B2 8/2015 Coli et al.
9,121,257 B2 9/2015 Coli et al.
(Continued)

FOREIGN PATENT DOCUMENTS

CA 2773843 A1 10/2012
CA 2787814 A1 2/2014
(Continued)

OTHER PUBLICATIONS

Prosecution History from U.S. Appl. No. 17/457,071, dated Aug. 8, 2022 through Apr. 10, 2023, 92 pp.
(Continued)

*Primary Examiner* — John M Zaleskas
(74) *Attorney, Agent, or Firm* — Shumaker & Sieffert, P.A.

(57) ABSTRACT

An example hybrid power system includes a mobile platform comprising: a generator set comprising: a reciprocating engine configured to convert natural gas into rotational mechanical energy; and a generator configured to convert rotational mechanical energy sourced from the reciprocating engine into electrical energy; an electrical energy storage system (ESS) configured to store electrical energy; an electrical motor configured to convert electrical energy sourced from a combination of the generator set and the ESS into rotational mechanical energy; and a pump configured to operate using rotational mechanical energy sourced from the electrical motor.

17 Claims, 3 Drawing Sheets

Related U.S. Application Data

(60) Provisional application No. 63/120,501, filed on Dec. 2, 2020.

(51) Int. Cl.
*F02B 63/04* (2006.01)
*F02B 63/06* (2006.01)
*F02D 29/04* (2006.01)
*F02D 29/06* (2006.01)
*F04B 17/03* (2006.01)
*F04B 17/05* (2006.01)

(52) U.S. Cl.
CPC ............ *F02B 63/047* (2013.01); *F02B 63/06* (2013.01); *F02D 29/04* (2013.01); *F02D 29/06* (2013.01); *F04B 17/03* (2013.01); *F04B 17/05* (2013.01); *F02B 2043/103* (2013.01); *F02B 2063/045* (2013.01)

(58) Field of Classification Search
CPC .... F04B 17/05; F02B 43/10; F02B 2043/103; F02B 63/042; F02B 63/047; F02B 63/06; F02B 2063/045; F02D 29/04; F02D 29/06; B26D 63/06
See application file for complete search history.

(56) References Cited

U.S. PATENT DOCUMENTS

| | | | |
|---|---|---|---|
| 9,140,110 B2 | 9/2015 | Coli et al. | |
| 9,366,114 B2 | 6/2016 | Coli et al. | |
| 9,475,020 B2 | 10/2016 | Coli et al. | |
| 11,732,561 B1 * | 8/2023 | Bosco | F02D 29/06 290/40 B |
| 2009/0101410 A1 | 4/2009 | Egilsson et al. | |
| 2010/0219007 A1 | 9/2010 | Dalum et al. | |
| 2014/0010671 A1 | 1/2014 | Cryer et al. | |
| 2015/0175013 A1 | 6/2015 | Cryer et al. | |
| 2015/0252661 A1 | 9/2015 | Glass | |
| 2015/0275891 A1 | 10/2015 | Chong | |
| 2015/0300336 A1 | 10/2015 | Hernandez et al. | |
| 2017/0129338 A1 | 5/2017 | Cryer et al. | |
| 2019/0154020 A1 | 5/2019 | Glass | |
| 2019/0178235 A1 | 6/2019 | Coskrey et al. | |
| 2019/0316447 A1 | 10/2019 | Oehring et al. | |
| 2020/0095848 A1 | 3/2020 | Rouse et al. | |
| 2020/0109616 A1 | 4/2020 | Oehring et al. | |
| 2020/0263528 A1 | 8/2020 | Fischer et al. | |
| 2021/0025382 A1 | 1/2021 | Harvell et al. | |
| 2021/0079758 A1 | 3/2021 | Yeung et al. | |
| 2021/0079851 A1 | 3/2021 | Yeung et al. | |
| 2021/0079902 A1 | 3/2021 | Yeung et al. | |
| 2021/0086851 A1 | 3/2021 | Zhang et al. | |
| 2021/0102451 A1 | 4/2021 | Robinson et al. | |
| 2021/0108489 A1 | 4/2021 | Shampine | |
| 2021/0207588 A1 | 7/2021 | Yeung et al. | |
| 2021/0230987 A1 | 7/2021 | Tanner | |
| 2021/0285312 A1 | 9/2021 | Joost et al. | |
| 2021/0310341 A1 | 10/2021 | Sherman et al. | |
| 2021/0348477 A1 | 11/2021 | Yeung et al. | |
| 2021/0381358 A1 | 11/2021 | Yeung et al. | |
| 2021/0372256 A1 | 12/2021 | Yeung et al. | |
| 2021/0381929 A1 | 12/2021 | Yeung et al. | |
| 2021/0396119 A1 | 12/2021 | Yeung et al. | |
| 2021/0396120 A1 | 12/2021 | Rother et al. | |
| 2021/0396222 A1 | 12/2021 | Yeung et al. | |
| 2021/0396223 A1 | 12/2021 | Yeung et al. | |
| 2022/0018232 A1 | 1/2022 | Oehring et al. | |
| 2022/0018284 A1 | 1/2022 | Yeung et al. | |
| 2022/0074345 A1 | 3/2022 | Yeung et al. | |
| 2022/0090477 A1 | 3/2022 | Zhang et al. | |
| 2022/0112889 A1 | 4/2022 | Yeung et al. | |
| 2022/0127943 A1 | 4/2022 | El Tawy et al. | |
| 2022/0154555 A1 | 5/2022 | El Tawy et al. | |
| 2022/0154642 A1 | 5/2022 | Yeung et al. | |
| 2022/0178235 A1 | 6/2022 | Zhang et al. | |
| 2022/0290549 A1 | 9/2022 | Zhang et al. | |
| 2022/0381126 A1 | 12/2022 | Cui et al. | |
| 2023/0029574 A1 | 2/2023 | Zhang et al. | |

FOREIGN PATENT DOCUMENTS

| | | |
|---|---|---|
| DE | 102013214635 A1 | 2/2015 |
| WO | 2019210417 A1 | 11/2019 |
| WO | 2020104088 A1 | 5/2020 |

OTHER PUBLICATIONS

U.S. Appl. No. 17/457,071, filed Dec. 1, 2021, naming inventors Bosco et al.

* cited by examiner

MOBILE HYBRID POWER PLATFORM

This application is a continuation of U.S. application Ser. No. 17/457,071, filed Dec. 1, 2021, which claims the benefit of U.S. Application No. 63/120,501, filed Dec. 2, 2020, the entire content of each application is incorporated herein by reference.

TECHNICAL FIELD

The disclosure relates to generator sets.

BACKGROUND

A generator set "genset" includes an engine, a generator coupled to the engine, and other optional control systems and accessories that enable the generator set to function to produce electricity. In some examples, generator sets may be used to provide on-demand backup power for facilities with large power needs, such as datacenters. In other examples, generator sets may be used to provide power to equipment or facilities that lack access to grid electricity.

DETAILED DESCRIPTION

Figure 1:
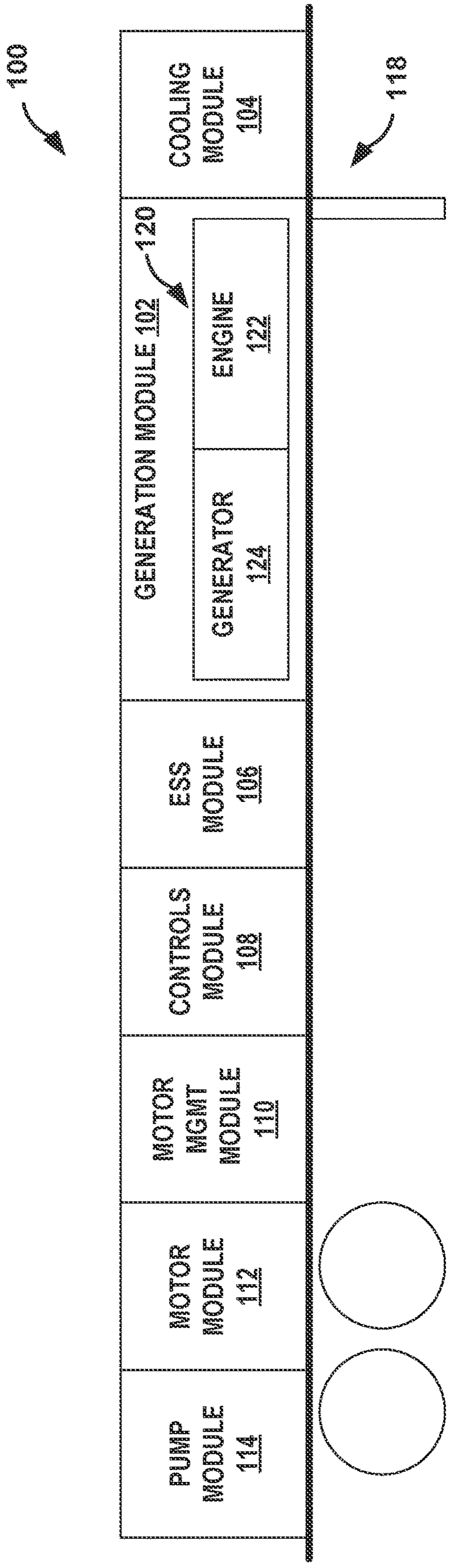
FIG. 1 is a conceptual diagram illustrating a side view of an example hybrid power system, in accordance with one or more techniques of this disclosure

Power generation may involve the conversion of chemical energy into mechanical energy, and/or mechanical energy into electrical energy. For instance, an engine may utilize fuel in a combustion process to convert chemical energy in the fuel to mechanical energy, which is supplied to a generator via a rotating drive shaft. The generator may convert the mechanical energy into electrical energy. The engine and the generator may be collectively referred to as a "genset."

Various types of engines may be used, such as reciprocating engines and turbines. While turbines may provide certain operating advantages over reciprocating engines (e.g., higher power to weight ratio, ability to run on a wide variety of fuels), turbines may be more expensive than reciprocating engines and/or may require a higher level of training to operate than reciprocating engines. Additionally, turbine engines may be less responsive (e.g., may take longer to adjust power output level) than reciprocating engines. Furthermore, power output from turbine engines may be significantly reduced with an increase in ambient air temperature.

Many mining or mineral extraction activities may take place out of reach of electrical grids. Gensets may be used to provide electrical power for such activities. For instance, a genset may be used to generate electrical energy to power an electrical motor for drilling (e.g., well drilling) and/or driving pumps (e.g., for so called "fracking").

Most gensets used for mining may utilize diesel powered reciprocating engines for various reasons. As one example, operation of a diesel-powered reciprocating engine may be fairly straightforward and not require specialty training. As another example, diesel powered reciprocating engines may be quite durable and have high reliability. Additionally, diesel fuel may be readily available in most locations. However, using diesel powered reciprocating engines for gensets used to supply power for mineral extraction may produce emissions that contribute to climate change, may be expensive to purchase and/or transport to the genset, or both.

In accordance with one or more techniques of this disclosure, a system may include a genset that is powered by natural gas and generates electrical energy that powers equipment used for mining or mineral extraction. For instance, a reciprocating engine of the genset may convert natural gas into rotational mechanical energy, a generator of the genset may convert rotational mechanical energy sourced from the reciprocating engine into electrical energy, an electrical motor of the system may convert electrical energy sourced from the generator into rotational mechanical energy, and a pump may operate using rotational mechanical energy sourced from the electrical motor. In some examples, the pump may be a fracking pump.

Using natural gas to operate the reciprocating engine may present one or more advantages. As one example, natural gas may be readily available and inexpensive at locations where mineral extraction or mining are taking place. For instance, produced gas, also known as flare gas, may be abundant, cheap, a by-product of focused oil production and lacks appropriate infrastructure to support bringing this rich resource to market.

However, reciprocating engines operated using natural gas may not be able to quickly change output power settings. This may be a disadvantage in certain contexts, such as fracking, where rapid changes in power (e.g., used by the electric motor/pump) are desired.

In accordance with one or more techniques of this disclosure, the system may further include an electrical energy storage system (ESS) and the electrical motor may operate using electrical energy sourced from both the ESS and the generator of the genset in parallel. By using electrical power from both the ESS and the genset, the electrical motor may be able to quickly change power output. For example, while the genset may provide a consistent amount of power, the ESS may cover rapid changes in electrical energy consumption. In this way, the system may operate using natural gas while also meeting the power output needs of fracking, drilling, and other mineral extraction contexts.

In some examples, it may be desirable to avoid having to assemble too many components "in the field." For instance, it may be desirable to avoid having to assemble the generator set, the ESS, and the electrical motor at the location where the mining or mineral extraction is occurring.

In accordance with one or more techniques of this disclosure, the generator set, the ESS, the pump, and/or the electrical motor may be located on a mobile platform (e.g., a single mobile platform). Examples of mobile platforms include trailers (e.g., to be towed), shipping containers, skids, and the like. In this way, the components may be assembled elsewhere, the mobile platform may be transported to the location where the mining or mineral extraction is occurring, and "in the field" assembly may be simplified.

FIG. 1 is a conceptual diagram illustrating a side view of an example hybrid power system, in accordance with one or more techniques of this disclosure. As shown in FIG. 1, hybrid power system 100 includes generation module 102, cooling module 104, ESS module 106, controls module 108, motor management module 110, motor module 112, and pump module 114. The modules (e.g., any combination of generation module 102, cooling module 104, ESS module 106, controls module 108, motor management module 110, motor module 112, and pump module 114) may be mounted on mobile platform 118.

Generation module 102 may include components capable of generating electrical power. As shown in FIG. 1, generation module 102 may include a generator set "genset" 120, which includes engine 122 and generator 124. Generator set 120 may include other components not shown, such as a starter system, and other accessory systems.

Generator 124 may be mechanically coupled to engine 122, such as through a mechanical shaft or any other mechanical link configured to transfer mechanical energy from engine 122 to generator 124. Generator 124 may be configured to convert mechanical energy provided by engine 122 to electrical energy. Generator 124 may include any generator capable of converting the mechanical energy to electrical energy, such as an alternator. Generator 124 may be configured to provide the generated electrical energy to one or more components of system 100, such as electrical system module 106.

Engine 122 may be configured generate mechanical energy from a fuel source and output the mechanical energy to generator 124 for conversion into electrical power. In accordance with one or more techniques of this disclosure, engine 122 may include a reciprocating engine configured to operate using natural gas.

Cooling module 104 may include components configured to dissipate heat generated by at least generation module 102. For example, cooling module 104 may include a radiator and plumbing that, along with plumbing included within generation module 102, forms a cooling loop that transfers hot coolant from generation module 102 to the radiator and transfers cooled coolant from the radiator back to generation module 102. Any suitable fluid may be used as the coolant, such as water, an alcohol, and the like.

Energy storage system (ESS) module 106 may provide energy storage capacity for hybrid power system 100. ESS module 106 may include any devices or systems capable of storing energy (e.g., electrical energy). Examples of devices that may be included ESS module 106 include, but are not limited to, batteries, capacitors, supercapacitors, flywheels, pneumatic storage, and any other device capable of storing electrical energy or energy that may be converted to electrical energy (without combustion). ESS module 106 may be coupled to an electrical bus and may be capable of providing electrical energy to the electrical bus and receiving electrical energy (e.g., for charging) from the electrical bus. As one specific example, ESS module 106 may include a battery system (e.g., a battery array, such as an array of secondary cells). In some examples, ESS module 106 may include components configured to support operation of the battery system, such as an inverter, filters, battery management system, climate control system, and an energy management control system.

Controls module 108 may include components configured to control operation of various components of hybrid power system 100, such as operating as a supervisory controller that manages and optimizes energy flow within hybrid power system 100. For instance, controls module 108 may control the flow of electrical energy amongst component of hybrid power system 100, such as generation module 102, ESS module 106, motor management module 110, and motor module 112. As one example, where an instant power requirement of motor module 112 is greater than an amount of electrical power currently being generated by generation module 102, controls module 108 may cause motor management module 110 to drive motor module 112 using power sources from both ESS module 106 and generation module 102. In this way, controls module 108 may be considered to include controls configured to generate, using electrical energy sourced from one or both of ESS module 106 and generation module 102, a power signal to power an electrical motor (e.g., of motor module 112). In some examples, controls module 108 may include a variable frequency drive (VFD) controller that controls operation of motor module 112.

Controls module 108 may include an interface configured to receive input commands. For instance, controls module 108 may include a user interface (e.g., any combination of buttons, dials, levels, sliders, etc.) to enable a user to provide a load power request. The load power request may specify an operational level of one or more components of system 100, such as motor module 112 or pump module 114. For instance, the load power request may specify that one or both of motor module 112 and pump module 114 operate at 50%, 60% . . . 100% power. The amount of power consumed by motor module 112 may vary based on the load power request. For instance, at higher load power requests, motor module 112 may consume greater amounts of power than at lower load power requests (e.g., there may be a positive correlation between load power request and power consumption of motor module 112).

Motor management module 110 may include components configured to manage operation of motor module 112. Motor management module 110 may include variable frequency drives (VFDs), motor protection components, start-stop circuit(s), inverters, etc. For instance, motor management module 110 may include an inverter configured to convert a direct current (DC) electrical signal into an alternating current (AC) electrical signal. For instance, the inverter may receive a DC electrical signal that includes DC power sourced from one or both of ESS module 106 and generation module 102, convert the received DC electrical signal into an AC electrical signal that is provided to an electrical load, such as a motor of motor module 112.

Motor module 112 may include an electrical motor configured to convert electrical energy into rotational mechanical energy. For instance, motor module 112 may include an AC induction motor configured to convert AC electrical power received from motor management module 110 into rotational mechanical energy. Motor module 112 may provide the rotational mechanical energy to any other component. As one example, where hybrid power system 100 is used to support fracking operations, motor module 112 may provide the rotational mechanical energy to pump module 114. As another example, where hybrid power system 100 is used for drilling, motor module 112 may provide the rotational mechanical energy to a drill stack.

In some examples, motor module 112 may operate as a generator that converts rotational mechanical energy into electrical energy. For instance, motor module 112 may convert stored rotational mechanical energy from a drill stack into electrical energy. In some examples, the electrical energy generated by motor module 112 may be used to charge ESS module 106.

Pump module 114 may include a fluidic pump configured to convert rotational mechanical energy into fluidic pressure. For instance, the pump of pump module 114 may be a pump configured to perform hydraulic fracturing for mineral extraction. As one example, pump module 114 may include a pump capable of 5000 horsepower at 318,000 ft-lbs of torque.

As noted above, any combination of generation module 102, cooling module 104, ESS module 106, controls module 108, motor management module 110, motor module 112, and pump module 114) may be mounted on mobile platform 118. Mobile platform 118 may be any movable object capable of carrying the combination of modules. Examples of mobile platform 118 include, but are not limited to, truck trailers, skids, shipping containers (e.g., ISO containers), barges, and the like.

Utilizing a hybrid power system, such as system 100, may present one or more advantages. As one example, system 100 may be able to provide large amounts of power independent of the electrical grid with no derate in hot, humid and high-altitude environments while also being capable of consuming a wide variety of gas qualities. As another example, by using natural gas as a fuel for engine 122, fuel costs may be reduced. As another example, by utilizing a reciprocating engine for engine 122, maintenance costs and training requirements may be reduced (e.g., as compared to turbine engines).

Figure 2:
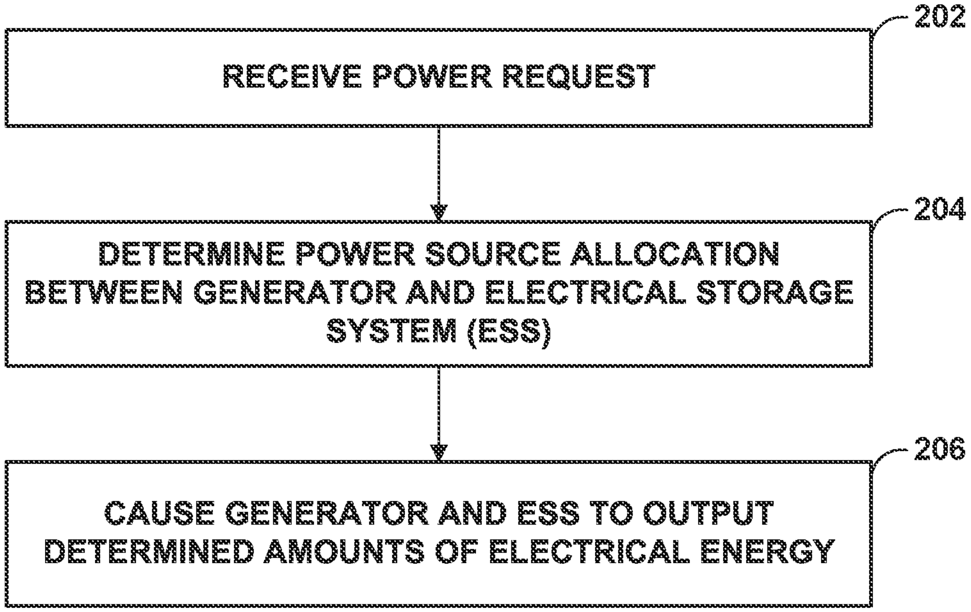
FIG. 2 is a flowchart illustrating example operations of a hybrid power system, in accordance with one or more techniques of this disclosure.

FIG. 2 is a flowchart illustrating example operations of a hybrid power system, in accordance with one or more techniques of this disclosure. For ease of explanation, the operations of FIG. 2 will be described with reference to hybrid power system 100 of FIG. 1. In other examples, other systems may perform the techniques of FIG. 2.

Hybrid power system 100 may receive a power request (202). For instance, controls module 108 of hybrid power system 100 may receive a request for motor module 112 to operate at 80% power.

Hybrid power system 100 may determine a power source allocation between a generator and an electrical energy storage system (ESS) (204). For instance, controls module 108 may obtain an amount of electrical energy presently being output by generation module 102 (e.g., 10 kW). Controls module 108 may determine (e.g., using a lookup table) an amount of electrical energy that corresponds to the power request. For instance, controls module 108 may determine that operation of motor module 112 at 80% power will require kW of electrical energy. Responsive to determining that the amount of electrical energy that corresponds to the power request is greater than the amount of electrical energy presently being output by generation module 102, controls module 108 may allocate a difference to ESS module 106. For instance, where generation module 102 is outputting 10 kW of power, the request will require 15 kW of power, controls module 108 may allocate a 5 kW load to ESS module 106.

Hybrid power system 100 may cause the generator and the ESS to out the determined amounts of energy (206). For instance, controls module 108 may cause ESS module 106 to output the allocated amount of power (e.g., to output 5 kW to continue with the previous example). In some examples, controls module 108 may adjust the amount of power output by generation module 102 in parallel with adjustment of the amount of power output by ESS module 106. In other examples, the amount of power output by generation module 102 may be constant (or relatively constant). As a result of this operation, increases in the load power request may result in increases in the amount of power sourced from ESS module 106. Similarly, decreases in the load power request may result in decrease in the amount of power sources from ESS module 106.

In some examples, controls module 108 may cause ESS module 106 to charge. For instance, responsive to determining that an amount of electrical energy sourced from ESS module 106 is less than a threshold amount of electrical energy, controls module 108 may cause ESS module 106 to charge using electrical energy sourced from generation module 102. In some examples, the threshold amount of electrical energy is zero. For instance, where zero, or less than zero, watts of power are to be sourced from ESS module 106 (and ESS module 106 is not fully charged), controls module 108 may cause ESS module 106 to charge using electrical energy sourced from generation module 102.

Figure 3:
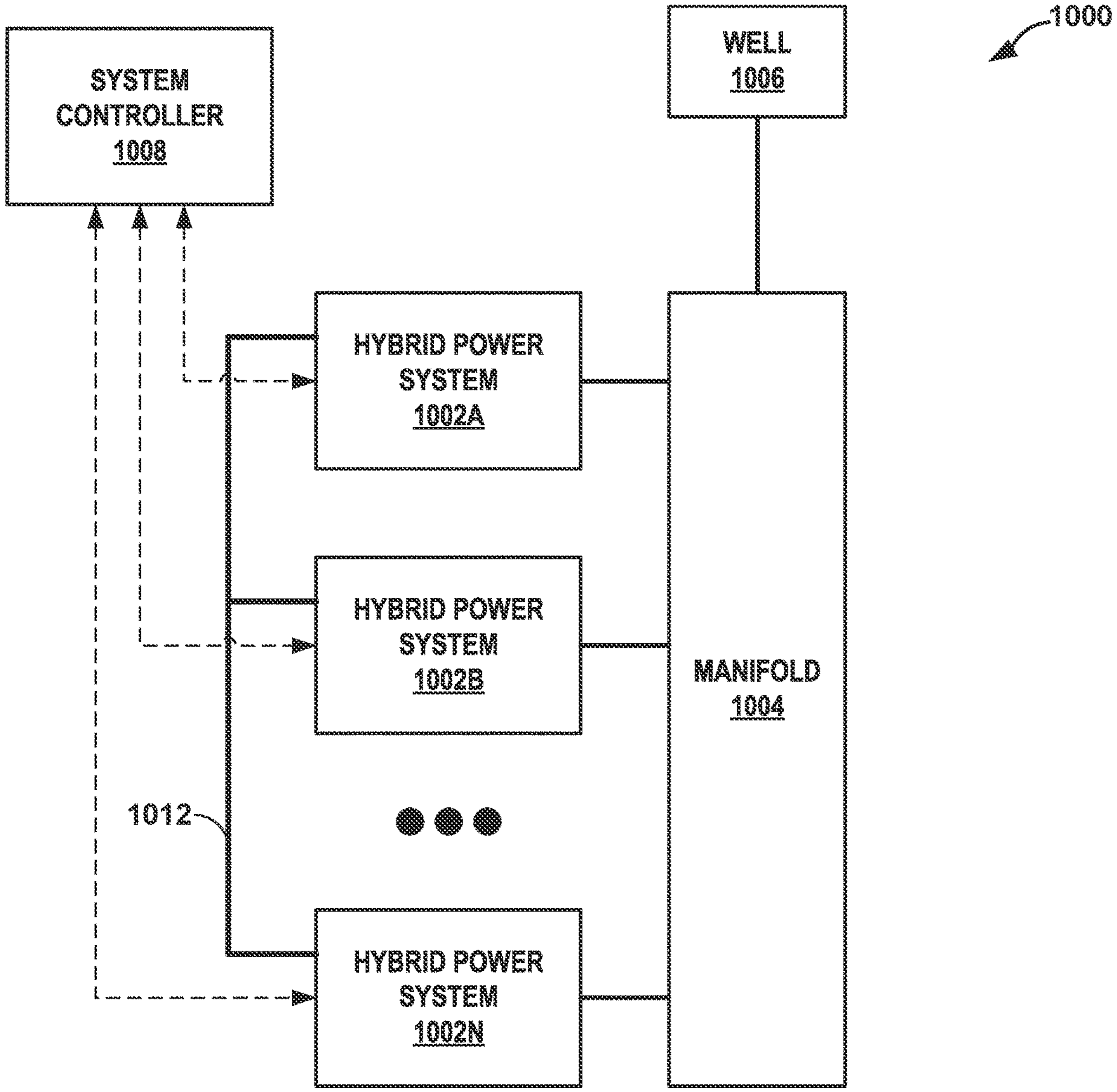
FIG. 3 is a conceptual diagram illustrating a multi-unit hybrid power system, in accordance with one or more techniques of this disclosure.

FIG. 3 is a conceptual diagram illustrating a multi-unit hybrid power system, in accordance with one or more techniques of this disclosure. As shown in FIG. 3, multi-unit hybrid power system 1000 may include hybrid power systems 1002A-1002N (collectively, "hybrid power systems 1002"), manifold 1004, well 1006, and interconnection 1012.

Each of hybrid power systems 1002 may be considered to be an example of hybrid power system 100 of FIG. 1. For instance, each of hybrid power systems 1002 may include a generator set (e.g., configured to run on natural gas), an electrical energy storage system (ESS) configured to store electrical energy, an electrical motor configured to convert electrical energy sourced from a combination of the generator set and the ESS into rotational mechanical energy, and a pump configured to operate using rotational mechanical energy sourced from the electrical motor.

Hybrid power systems 1002 may each be connected (e.g., fluidically) to manifold 1004, which may combine fluid output by hybrid power systems into a single flow that is provided to well 1006. In some examples, the connections between hybrid power systems 1002 and manifold 1004 may be formed of high pressure piping.

By utilizing a multi-unit hybrid system, such as system 1000, equipment operators may be able to achieve a relatively tight well pad layout (e.g., minimizing foot print compared to traditional approaches). Furthermore, as each of hybrid power systems 1002 is modular, additional hybrid power systems can be added or removed without significant difficulty.

Multi-unit hybrid systems, such as system 1000, may present one or more reliability and failover advantages. In some examples, system 1000 may include interconnection 1012, which may facilitate one or more reliability and failover advantages. For instance, interconnection 1012 may be capable of transporting electrical power and/or communications amongst hybrid power systems 1002. As one example, interconnection 1012 may include a common electrical bus. Some example failover capabilities are discussed below:

As a first failover advantage, generation modules of hybrid power systems 1002 may be able to compensate for failures in other generation modules. For instance, generation modules of each of hybrid power systems 1002 may operate at a reduced load factor that is less than 100%. For example, in a normal state (e.g., with no generation modules failed), generation modules of hybrid power systems 1002 may operate at 80% load factor. As such, in the event of a failure in a generation module of a hybrid power system, load factors in generation modules in remaining hybrid power systems 1002 may be increased to offset the failure. In some of such examples, the power generated by the remaining hybrid power systems 1002 may be transported (e.g., via interconnection 1012) to power a motor of the failed hybrid power system. As such, a motor of a particular hybrid power system of hybrid power systems 1002 may continue to operate, even when the generation module of the particular hybrid power system has failed.

As a second failover advantage, energy storage systems of hybrid power systems 1002 may compensate for failures in one or more generation modules. As discussed above, in some examples, an energy storage system of a hybrid power system may charge using excess power (e.g., peak shaving above a specified generation module load or system load). In the event of a failure (e.g., in a single generation module or in multiple generation modules), system 1000 may be capable of operating using power stored in the energy storage systems. In this way, system 1000 may make up for a power shortfall and provide an operator the ability to complete well 1006 and address the downed assets.

As a third failover advantage, energy storage systems of hybrid power systems 1002 may compensate for failures in fuel supply to generation modules. For instance, in the event of a system wide gas supply loss (e.g., where all generation modules come off-line), energy storage systems of hybrid power systems 1002 may be capable of delivering enough power for the operator to flush out well 1006 and prevent any downhole issues. In some examples, an energy storage system of a first hybrid power system of hybrid power systems 1002 may supply power (e.g., via interconnection 1012) to operate a motor of a second hybrid power system of hybrid power systems 1002. As such, the motors of all hybrid power systems may be available for well flushing even in the event of gas supply loss. Also in this way, system 1000 may have black start capability. For instance, after the fuel supply is restored, combustion motors of hybrid power systems 1002 may be able to re-start using energy stored in energy storage systems (e.g., without requiring external power to re-start).

In addition to the aforementioned failover advantages, system 1000 may present one or more advantages for maintenance and redundancy. Some example maintenance and redundancy capabilities are discussed below:

As a first maintenance and redundancy advantage, hybrid power systems of hybrid power systems 1002 may easily be used as spares. For instance, one or more of hybrid power systems 1002 may be considered to be a spare hybrid power system. By including one or more spare hybrid power systems in hybrid power systems 1002, system 1000 may achieve a higher reliability level. For instance, in the event of a failure in a first hybrid power system of hybrid power systems 1002, another of hybrid power systems 1002 may quickly be brought online to take the place of the failed unit.

As a second maintenance and redundancy advantage, the use of reciprocating motors may provide familiarity to mechanics, equipment operators and technicians. Reciprocating Gas and Diesel engines may be commonly used in oil and gas applications, with most mechanics being responsible to maintain and troubleshoot both technologies. Mechanics and technicians are easily cross trained and can quickly come up to speed with maintaining and troubleshooting systems such as system 1000. This advantage is in direct contrast to the disadvantage of using turbine technology, which often requires highly trained turbine technicians and lacks accessible talent who can quickly be ramped up to maintain these expensive and complex machines.

System 1000 also offers scalability advantages. For instance, turbines are often delivered in a single high-power output power generation source and not flexible scaling up or down in regions, where less capacity is required, operating less efficiently, severely impacting fuel consumption and emissions. In contrast, system 1000 may allow for varying quantities of hybrid power systems in hybrid power systems 1002. For instance, the quantity of hybrid power systems may be adjusted to deliver higher flexibility for optimizing system efficiency to address emissions, life-cycle-costs, and/or fuel consumption. Furthermore, the inclusion of the energy storage systems in hybrid power systems 100 may enable the interjection of recaptured energy during multiple situations to avoid bringing another generation module online or running generation modules during a variety of load situations.

In some examples, system 1000 may include a controller that monitors and controls operation of various components of system 1000. For instance, system controller 1008 may control and/or monitor operation of hybrid power systems 1002. System controller 1008 may perform a variety of operations such as orchestrating system power sources, automating charging/discharge process, managing battery system health, and/or controlling generator module operating state. As one example, to orchestrate system power sources, system controller 100 may determine a desired amount of power needed to perform a current operation (e.g., at well 1006) and allocate power providing across hybrid power systems 1002. For instance, where 4 MW of power is required and two hybrid power systems are available, each with a maximum generation capacity of 2.5 MW, system controller 1008 may cause the two hybrid power systems to each generate 2 MW of power. System controller 1008 may be connected to hybrid power systems 1002 via any suitable means, including wired and wireless connections.

In some examples, system controller 1008 may utilize a machine learning algorithm that monitors operation between the generator modules, energy storage systems, and end-point-devices. Such a machine learning algorithm may enable system controller 10 adjust on the fly and/or adapt to operating conditions without end-user intervention.

While illustrated as a discrete unit in FIG. 3, system controller 1008 may be located in a hybrid power system of hybrid power systems 1002. For instance, a controls module of a hybrid power system of hybrid power systems 1002 may be designated as system controller 1008. In some examples, hybrid power systems 1002 may operate using a "plug and play" interface where controls modules automatically negotiate assignment of the system controller role. This may reduce the need for dial in and setup when equipment is moved or mixed within a fleet of hybrid power systems 1002.

In some situations, components of a power system may be discretely packaged and separately transported. Such an arrangement (e.g., separate components) may require extensive interconnection between components, which may result in a complex in-field assembly process. Additionally, a system that include separate components may require a relatively large footprint (e.g., in square feet/square meters).

As discussed above and in accordance with this disclosure, components of a hybrid power system may be located on a single mobile platform, such as a truck trailer or shipping container. For instance, a combustion motor, a generator, an energy storage system, an electric motor, and a pump may all be located on a single mobile platform. The single mobile platform may be transported to the worksite as a single unit, minimizing the need to extensive in-field assembly. Additionally, by locating the components on a single mobile platform, the required footprint may be reduced (e.g., as compared to separate components).

The following numbered examples may illustrate one or more aspects of this disclosure:

Example 1A. A system comprising a hybrid power system, the hybrid power system comprising: a generator set comprising: a reciprocating engine configured to convert natural gas into rotational mechanical energy; and a generator configured to convert rotational mechanical energy sourced from the reciprocating engine into electrical energy; an electrical energy storage system (ESS) configured to store electrical energy; an electrical motor configured to convert electrical energy sourced from a combination of the generator set and the ESS into rotational mechanical energy; and a pump configured to operate using rotational mechanical energy sourced from the electrical motor.

Example 2A. The system of example 1A, wherein the generator set, the ESS, the electrical motor, and the pump are located on a single mobile platform.

Example 3A. The system of example 1A, wherein the ESS comprises a battery system.

Example 4A. The system of any of examples 1A-3A, further comprising a radiator configured to radiate heat generated by the reciprocating engine.

Example 5A. The system of any of examples 1A-4A, further comprising controls configured to generate, using electrical energy sourced from one or both of the ESS and the generator set, a power signal to power the electrical motor.

Example 6A. The system of example 5A, wherein the electrical motor comprises an alternating current (AC) electrical motor, the system further comprising an inverter configured to generate the power signal as an AC power signal.

Example 7A. The system of example 5A, wherein the controls are configured to: receive a load power request; and allocate the load power request amongst the ESS and the generator set.

Example 8A. The system of example 7A, wherein, responsive to an increase in the load power request, the controls are configured to increase the amount of electrical energy sourced from the ESS.

Example 9A. The system of example 7A or example 8A, wherein, responsive to a reduction in the load power request, the controls are configured to decrease the amount of electrical energy sourced from the ESS.

Example 10A. The system of example 9A, wherein, responsive to determining that an amount of electrical energy sourced from the ESS is less than a threshold amount of electrical energy, the controls are configured to cause the ESS to charge using electrical energy sourced from the generator set.

Example 11A. The system of example 10A, wherein the threshold amount of electrical energy is zero.

Example 12A. The system of any of examples 1A-11A, wherein the hybrid power system is a first hybrid power system, and wherein the system comprises a plurality of hybrid power systems that includes the first hybrid power system.

Example 13A. The system of example 12A, further comprising a system controller configured to control operation of the plurality of hybrid power systems.

Example 14A. The system of any of examples 1A-13A, wherein the pump comprises a pump configured to perform hydraulic fracturing for mineral extraction.

Example 1B. A system comprising: a generator set comprising: a reciprocating engine configured to convert natural gas into rotational mechanical energy; and a generator configured to convert rotational mechanical energy sourced from the reciprocating engine into electrical energy; an electrical energy storage system (ESS) configured to store electrical energy; and an electrical motor configured to convert electrical energy sourced from a combination of the generator set and the ESS into rotational mechanical energy, wherein the electrical motor is configured to rotate a drill stack.

Example 2B. The system of example 1B, wherein the generator set, the ESS, and the electrical motor are located on a mobile platform.

Example 3B. The system of example 1B, wherein the ESS comprises a battery system.

Example 4B. The system of any of examples 1B-3B, further comprising a radiator configured to radiate heat generated by the reciprocating engine.

Example 5B. The system of any of examples 1B-4B, further comprising controls configured to generate, using electrical energy sourced from one or both of the ESS and the generator set, a power signal to power the electrical motor.

Example 6B. The system of example 5B, wherein the electrical motor comprises an alternating current (AC) electrical motor, the controls further comprising an inverter configured to generate the power signal as an AC power signal.

Example 7B. The system of example 5B, wherein the controls are configured to: receive a load power request; and allocate the load power request amongst the ESS and the generator set.

Example 8B. The system of example 7B, wherein, responsive to an increase in the load power request, the controls are configured to increase the amount of electrical energy sourced from the ESS.

Example 9B. The system of example 7B or example 8B, wherein, responsive to a reduction in the load power request, the controls are configured to decrease the amount of electrical energy sourced from the ESS.

Example 10B. The system of example 9B, wherein, responsive to determining that an amount of electrical energy sourced from the ESS is less than a threshold amount of electrical energy, the controls are configured to cause the ESS to charge using electrical energy sourced from the generator set.

Example 11B. The system of example 10B, wherein the threshold amount of electrical energy is zero.

Example 12B. The system of any of examples 1B-11B, wherein the hybrid power system is a first hybrid power system, and wherein the system comprises a plurality of hybrid power systems that includes the first hybrid power system.

Example 13B. The system of example 12B, further comprising a system controller configured to control operation of the plurality of hybrid power systems.

Example 14B. The system of any of examples 5B-13B, wherein the electrical motor is configured to operate as a generator that generates electrical energy using rotational energy stored in the drill stack, and wherein the controls are configured to cause the ESS to charge using electrical energy generated by the electrical motor.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A system comprising a plurality of hybrid power systems, each respective hybrid power system of the plurality of hybrid power systems comprising:

a respective mobile platform comprising and having disposed thereon:

a respective generator set comprising:

a respective reciprocating engine configured to convert natural gas into rotational mechanical energy; and a respective generator configured to convert rotational mechanical energy sourced from the respective reciprocating engine into electrical energy;

a respective electrical energy storage system (ESS) configured to store electrical energy;

a respective electrical motor configured to convert electrical energy sourced from a combination of the respective generator set and the respective ESS into rotational mechanical energy;

a respective radiator configured to radiate heat generated by the respective reciprocating engine; and a respective pump configured to operate using rotational mechanical energy sourced from the respective electrical motor, the system further comprising:

a system controller configured to control operation of the plurality of hybrid power systems, wherein the respective pumps of each of the plurality of hybrid power systems are fluidically connected to a common manifold, wherein at least one of the plurality of hybrid power systems comprises a spare hybrid power system, and wherein the system controller is configured to:

responsive to determining that a generator set of a particular hybrid power system of the plurality of hybrid power systems has failed:

increase load factors of non-failed hybrid power systems of the plurality of hybrid power systems; and cause the respective electrical motor of the particular hybrid power system to operate using electrical energy supplied by the non-failed hybrid power systems of the plurality of hybrid power systems.

2. The system of claim 1, wherein the mobile platform comprises a trailer.

3. The system of claim 1, wherein the ESS comprises a battery system.

4. The system of claim 1, wherein each respective hybrid power system further comprises a respective controller comprising processing circuitry configured to generate, using electrical energy sourced from one or both of the respective ESS and the respective generator set, a power signal to power the respective electrical motor.

5. The system of claim 4, wherein the electrical motor comprises an alternating current (AC) electrical motor, the system further comprising an inverter configured to generate the power signal as an AC power signal.

6. The system of claim 4, wherein the respective controller is configured to:

receive a respective load power request; and allocate the respective load power request amongst the respective ESS and the respective generator set.

7. The system of claim 6, wherein, responsive to an increase in the respective load power request, the respective controller is configured to increase an amount of electrical energy sourced from the respective ESS.

8. The system of claim 7, wherein, responsive to a reduction in the respective load power request, the respective controller is configured to decrease the amount of electrical energy sourced from the respective ESS.

9. The system of claim 8, wherein, responsive to determining that the amount of electrical energy sourced from the respective ESS is less than a threshold amount of electrical energy, the respective controller is configured to cause the respective ESS to charge using electrical energy sourced from the respective generator set.

10. The system of claim 1, wherein the respective pump comprises a pump configured to perform hydraulic fracturing for mineral extraction.

11. The system of claim 4, wherein the respective controller of a particular hybrid power system operates as the system controller.

12. The system of claim 11, wherein the controllers of the plurality of hybrid power systems are configured to negotiate with each other to designate the respective controller of the particular hybrid power system as the system controller.

13. The system of claim 1, wherein the system controller is located within a particular hybrid power system of the plurality of hybrid power systems.

14. The system of claim 1, wherein the system controller is further configured to:

receive data representing operating parameters of the plurality of hybrid power systems; and adjust, based on the received data, operation of the plurality of hybrid power systems.

15. The system of claim 14, wherein, to adjust the operation of the plurality of hybrid power systems, the system controller is configured to:

execute a machine learning algorithm to process the received data; and adjust, based on output of the machine learning algorithm, the operation of the plurality of hybrid power systems.

16. The system of claim 15, wherein the system controller is configured to adjust the operation of the plurality of hybrid power systems automatically without end-user intervention.

17. The system of claim 14, wherein the system controller is further configured to:

determine a desired amount of power to perform an operation; and allocate the desired amount of power amongst the plurality of hybrid power systems.

* * * * *